(12) United States Patent
Frazier, Jr.

(10) Patent No.: US 10,194,760 B2
(45) Date of Patent: Feb. 5, 2019

(54) PICTURE HANGING DEVICES AND METHODS THEREOF

(71) Applicant: Robert C. Frazier, Jr., Christiansburg, VA (US)

(72) Inventor: Robert C. Frazier, Jr., Christiansburg, VA (US)

( * ) Notice: Subject to any disclaimer, the term of this patent is extended or adjusted under 35 U.S.C. 154(b) by 37 days.

(21) Appl. No.: 15/221,284

(22) Filed: Jul. 27, 2016

(65) Prior Publication Data

US 2017/0027341 A1 Feb. 2, 2017

Related U.S. Application Data

(60) Provisional application No. 62/197,231, filed on Jul. 27, 2015.

(51) Int. Cl.
*G01B 5/25* (2006.01)
*A47G 1/20* (2006.01)
*G01C 9/34* (2006.01)

(52) U.S. Cl.
CPC .............. *A47G 1/205* (2013.01); *G01C 9/34* (2013.01)

(58) Field of Classification Search
CPC .................................. A47G 1/205; G01C 9/34
USPC .......... 33/332, 381, 451, 486, 613, 645, 666
See application file for complete search history.

(56) References Cited

U.S. PATENT DOCUMENTS

| | | | | |
|---|---|---|---|---|
| 776,897 | A * | 12/1904 | Ferris | B43L 9/04 33/27.03 |
| 4,241,510 | A * | 12/1980 | Radecki | A47G 1/205 33/451 |
| 6,029,362 | A | 2/2000 | Miodragovic | |
| 6,421,928 | B1 | 7/2002 | Miller | |
| 6,430,827 | B2 * | 8/2002 | Ruther | B25H 7/00 33/379 |
| 7,155,840 | B1 * | 1/2007 | Carbonaro | A47G 1/205 33/451 |
| 7,503,126 | B2 | 3/2009 | Robins | |
| 7,513,056 | B1 * | 4/2009 | Hobden | B25H 7/00 248/466 |
| 7,690,129 | B2 * | 4/2010 | Bender | A47G 1/205 33/451 |
| 8,347,518 | B1 * | 1/2013 | Martinez | A47G 1/205 33/613 |
| 9,475,188 | B2 * | 10/2016 | Miller | B25H 7/04 |
| 2001/0013176 | A1 * | 8/2001 | Ruther | B25H 7/00 33/451 |

(Continued)

OTHER PUBLICATIONS

International Search Report for corresponding PCT Application No. PCT/US16/44290, dated Nov. 10, 2016, pp. 1-7.

*Primary Examiner* — G. Bradley Bennett
(74) *Attorney, Agent, or Firm* — LeClairRyan PLLC

(57) ABSTRACT

A picture hanging device includes a longitudinal member having a longitudinal track extending along at least a portion of a length of the longitudinal member and at least one level located within the longitudinal member. At least two alignment members are moveable along the longitudinal track, each of the at least two alignment members having a securing device configured to detachably secure the alignment members in place at a location along the longitudinal track. The at least two alignment members each have a hollow internal portion configured to receive a punch device. A method of making a picture hanging device is also disclosed.

18 Claims, 16 Drawing Sheets

(56) References Cited

U.S. PATENT DOCUMENTS

2005/0097765 A1* 5/2005 Sorensen ................ B25H 7/00
  33/666
2013/0118022 A1 5/2013 Propp et al.

* cited by examiner

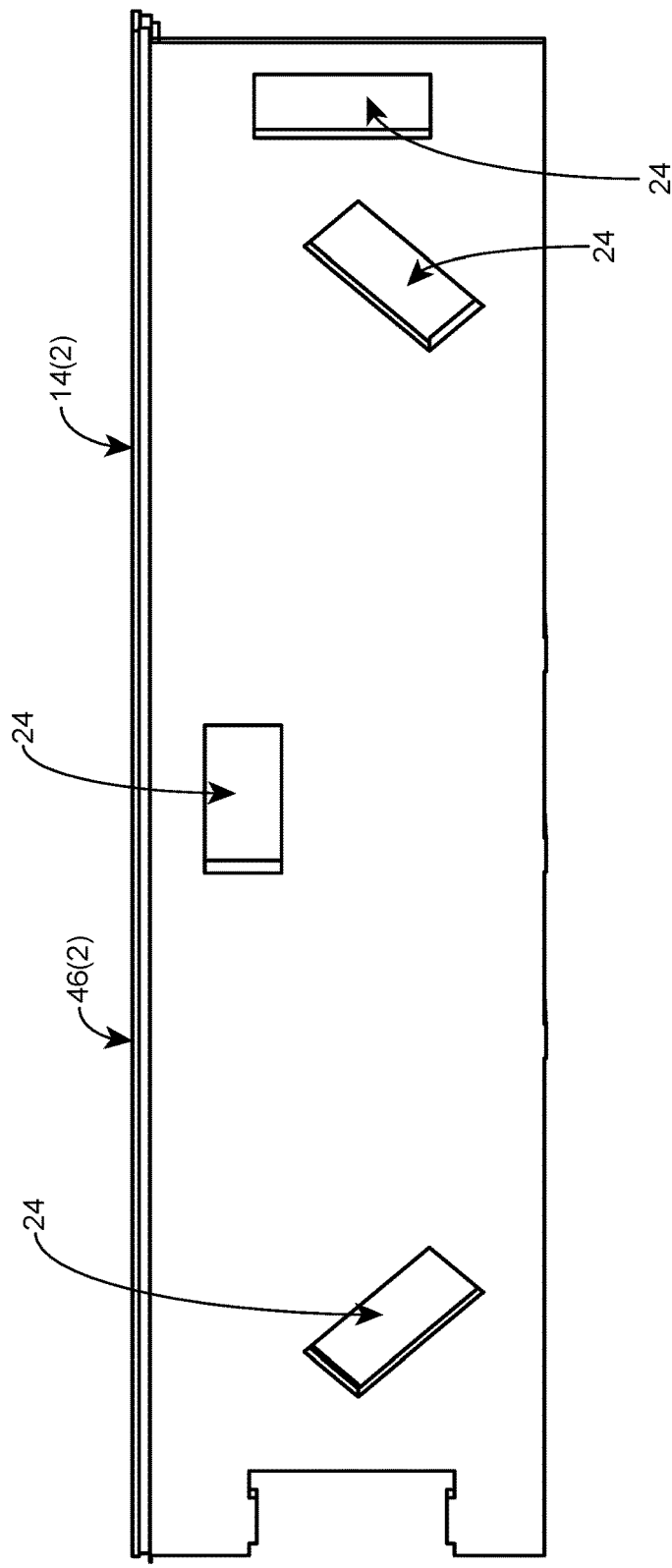

PICTURE HANGING DEVICES AND METHODS THEREOF

This application claims the benefit of U.S. Provisional Patent Application Ser. No. 62/197,231, filed Jul. 27, 2015, which is hereby incorporated by reference in its entirety.

FIELD

This technology relates to a picture hanging device and methods of making a picture hanging device.

BACKGROUND

Framed pictures and other framed objects, such as artwork, diplomas, or awards, are hung on walls in numerous households, offices, and other locations. While hanging framed pictures and other framed objects provides for visual enhancement of a living space, the process of hanging framed pictures and other framed objects can be a frustrating experience.

Specifically, obtaining the precise alignment of the framed pictures and other framed objects includes a number of time consuming steps. The picture frame or other framed object must be measured to determine the spacing of the hooks or other hanging mechanism located on the frame. The wall must then be marked to provide the correct spacing for the wall anchors. This process further requires ensuring that the wall anchors are placed at the correct height to ensure that the picture will hang in a level fashion.

These difficulties in hanging pictures may discourage people from hanging pictures, despite the enhancement they provide. Further, errors in the picture hanging process may result in a number of holes in the wall that are unsightly and require repair, or unevenly hung pictures.

Devices have been developed to assist in picture hanging. However, these devices are often overly complex, difficult to use, and costly.

SUMMARY

A picture hanging device includes a longitudinal member having a longitudinal track extending along at least a portion of a length of the longitudinal member and at least one level located within the longitudinal member. At least two alignment members are moveable along the longitudinal track, each of the at least two alignment members having a securing device configured to detachably secure the alignment members in place at a location along the longitudinal track. The at least two alignment members each have a hollow internal portion configured to receive a punch device.

A method of making a picture hanging device includes providing a longitudinal member having a longitudinal track extending along at least a portion of a length of the longitudinal member and at least one level located within the longitudinal member. At least two alignment members are coupled to the longitudinal member. The at least two alignment members are moveable along the longitudinal track, each of the at least two alignment members having a securing device configured to detachably secure the alignment members in place at a location along the longitudinal track. The at least two alignment members each include a hollow internal portion configured to receive a punch device.

Accordingly, this technology provides a number of advantages including providing a more efficient and easy to use picture hanging device which provides for accurate, level picture hanging.

BRIEF DESCRIPTION OF THE DRAWINGS

FIG. 7A is a front perspective view of a second portion of the exemplary picture hanging device shown in FIG. 5A;

DETAILED DESCRIPTION

An example of a picture hanging device 10(1) is illustrated in FIGS. 1-3B. In this particular example the picture hanging device 10(1) includes a longitudinal member 12(1) with a track 14(1), at least two alignment members 16(1), one or more levels 18, and one or more punch devices 20, although the picture hanging device 10(1) may include other types or numbers of devices, components, and/or other elements in other configurations. This technology provides a number of advantages including providing a more efficient and easy to use picture hanging device that provides for accurate, level picture hanging.

Figure 1:
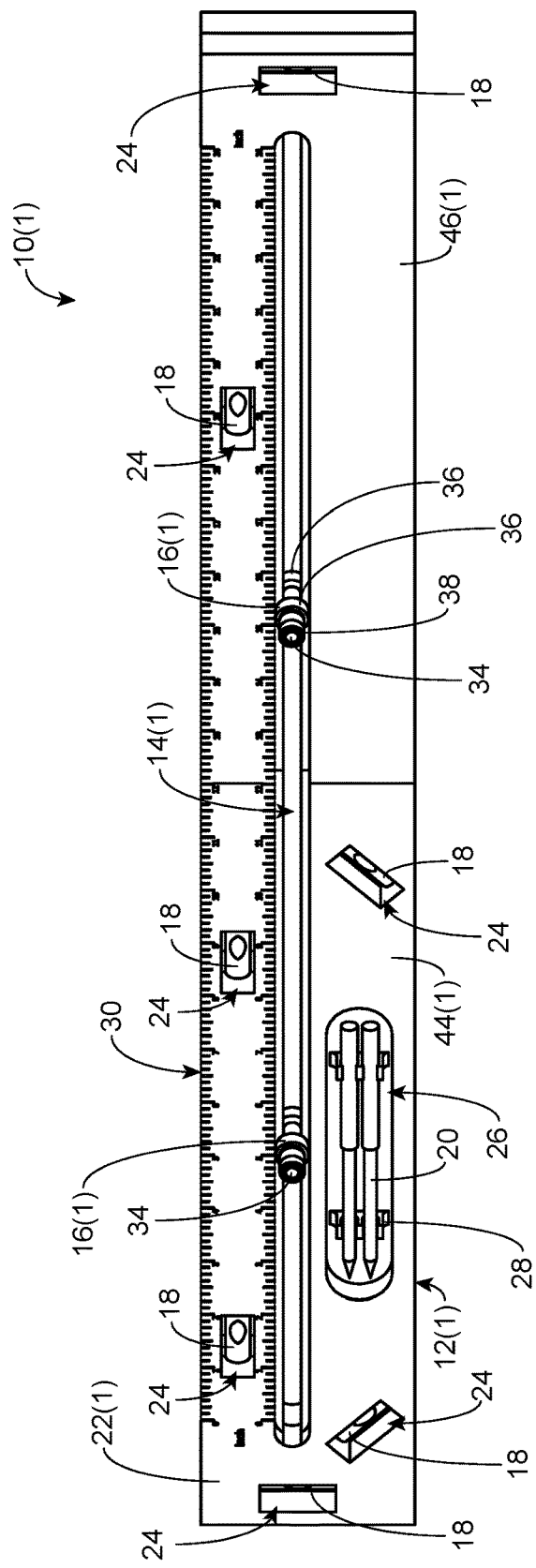
FIG. 1 is a front perspective view of an exemplary picture hanging device.

Referring more specifically to FIG. 1, in this particular example the longitudinal member 12(1) includes a body portion 22(1) surrounding the track 14(1). The longitudinal member 12(1) can be molded from plastic, although the longitudinal member 12(1) can be formed of other types and/or numbers of materials, such as metals, using other manufacturing techniques. Additionally in this example, the longitudinal member 12(1) is formed of a lightweight material to facilitate use of the picture hanging device 10(1), although materials which have other weights could be used. Further, in this example, the longitudinal member 12(1) is formed as two separate portions as illustrated in FIGS. 2A-3B and described below. Alternatively, the longitudinal member 12(1) may be formed in other configurations, such as a single unitary piece by way of example only.

Figure 2A:
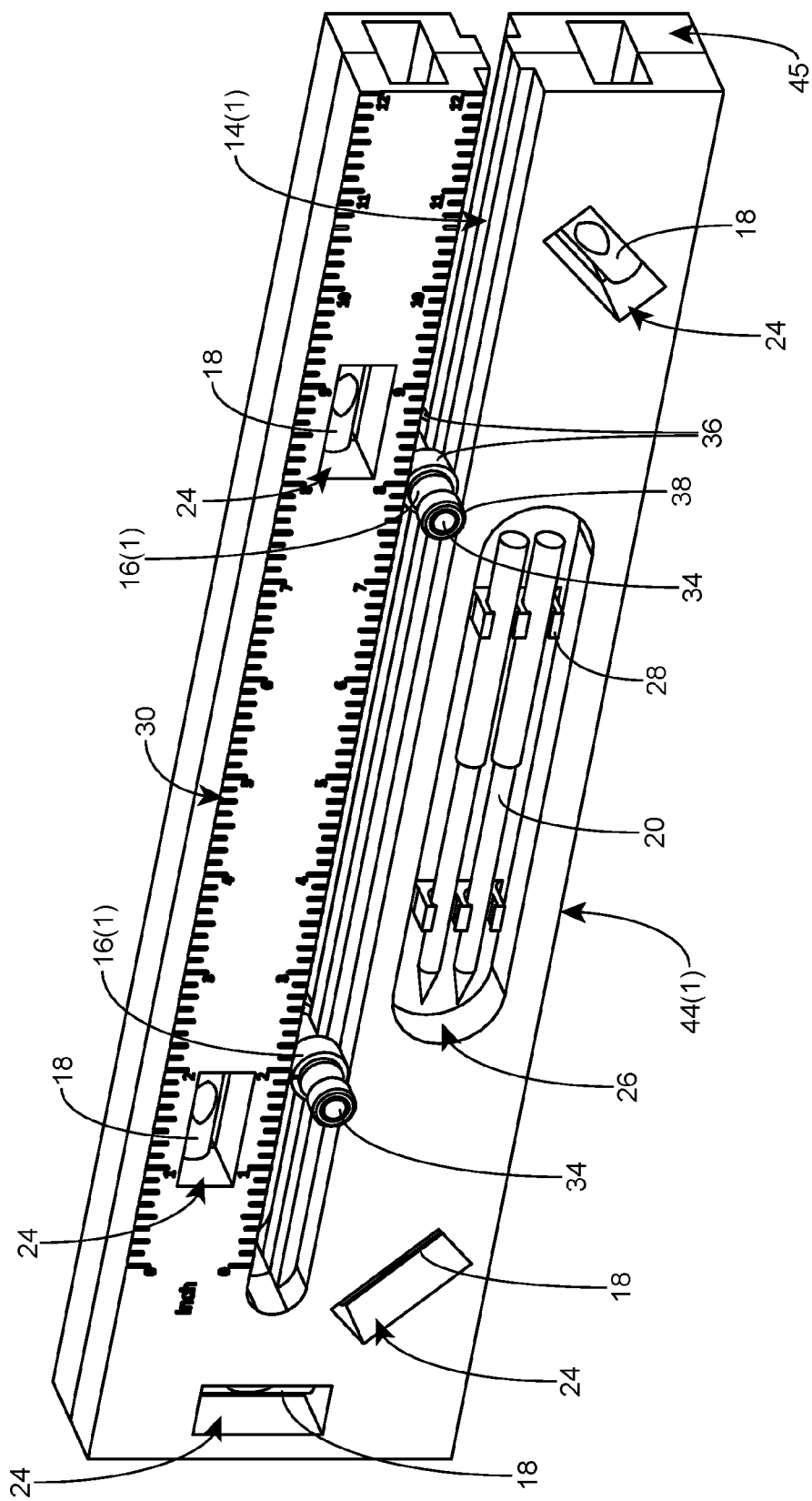
FIG. 2A is a front perspective view of a first portion of the exemplary picture hanging device shown in FIG. 1.
Figure 2B:
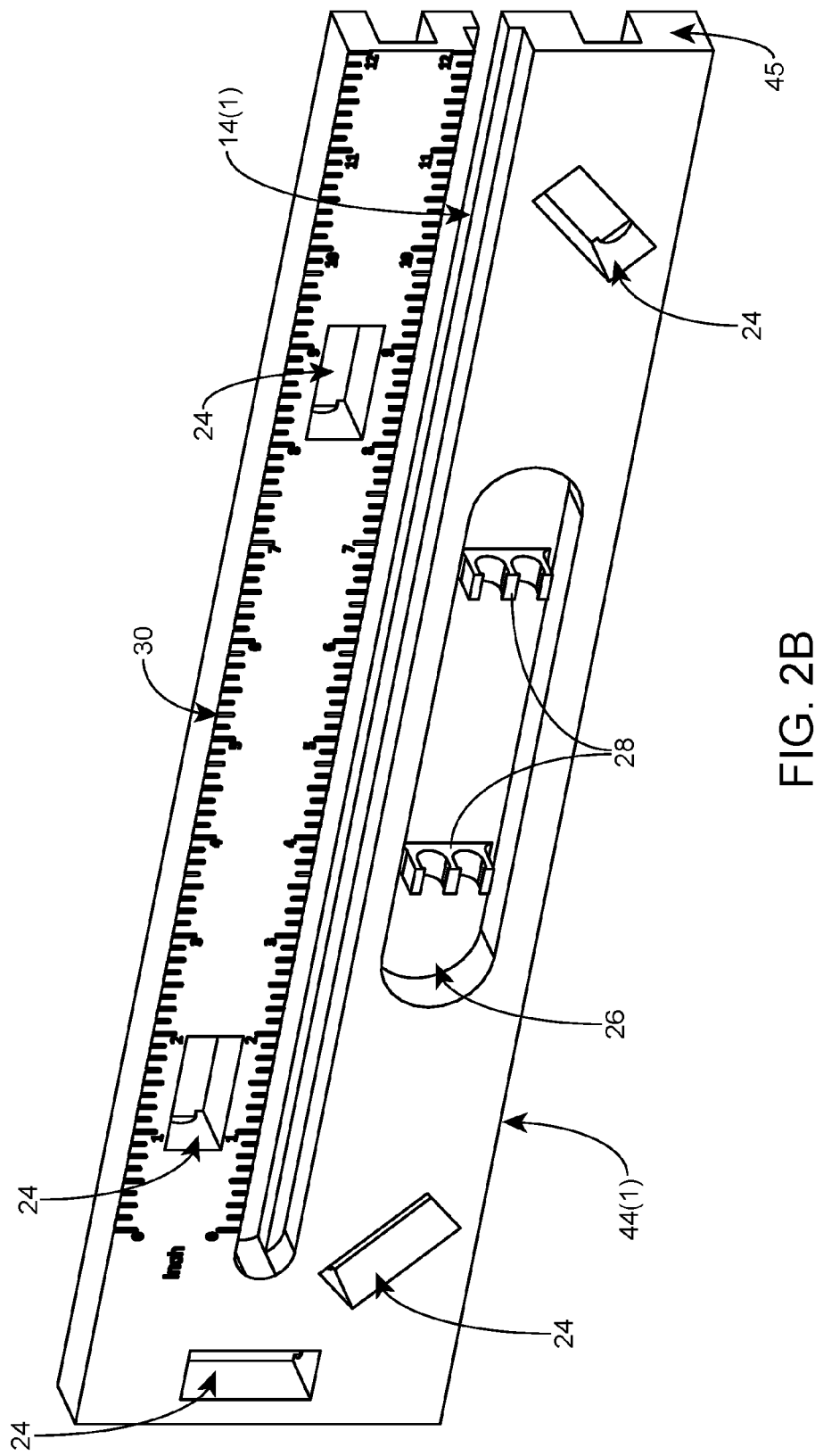
FIG. 2B is a front perspective view of the first portion of the exemplary picture hanging device shown in FIG. 2A with the levelling devices and punch devices removed.

In this particular example, the body portion 22(1) of the longitudinal member 12(1) includes a plurality of holes 24 located through the body portion 22(1) configured to receive and securely hold level devices 18 to allow the longitudinal member 12(1) to be placed in a level position during use. Although a plurality of holes 24 are described, in other examples a single hole 24 with a level device 18 may be utilized. The plurality of holes 24 may be located at various locations in the body portion 22(1) of the longitudinal member 12(1). In one example, the body portion 22(1) of the longitudinal member 12(1) also includes an optional holding compartment 26 that provides a recessed area within the body portion 22(1) having one or more holding elements 28 as shown in FIG. 2B configured to securely receive, by way of example through a snap fit, at least two of the punch devices 20 for storage when not in use, although the longitudinal member 12(1) may include other types and/or numbers of other compartments configured to hold other types and/or numbers of devices or elements for use with the picture hanging device 10(1).

Referring again to FIG. 1, in this particular example, the track 14(1) is located internally within the body portion 22(1) of the picture hanging device 10(1) and extends along a portion of the length of the longitudinal member 12(1). The body portion 22(1) of the longitudinal member 12(1) includes markings 30 to serve as a ruler 32 located along the track 14(1) for precise alignment of the alignment members 16(1) along the track 14(1) as discussed below.

In this particular example, the at least two alignment members 16 are located within the track 14(1) of the longitudinal member 12(1), although other numbers of alignment members 16(1) may be utilized. The alignment members 16(1) are configured to be slidably movable along the track 14(1). In this example, the alignment members 16(1) are cylindrical with a hollow center 34 configured to receive one of the punch devices 20, such as a 3/16 inch punch device, although the alignment members 16(1) may have other configurations to receive other devices therethrough. The alignment members 16(1) each may include a pair of supports 36 as shown in FIG. 2A that may be located on either side of the track 14(1) of the longitudinal member 12(1) to maintain the center of the alignment members 16(1) along the track 14(1). The alignment members 16(1) may be formed of plastic, although other types and/or numbers of materials such as metal may be utilized.

The alignment members 16(1) also each include a securing device 38(1) as shown in FIG. 2A configured to allow the alignment members 16(1) to be detachably fixed or otherwise secured at a location along the track 14(1). In one example, the securing device 38(1) is a threaded cap that may be screwed onto a threaded end of each alignment member 16(1), such that the securing device 38(1) can be tightened in a screwing fashion against the body portion 22(1) of the longitudinal member 12(1) to detachable secure a position of each of the alignment members 16(1) along the track 14(1) of the longitudinal member 12(1), although other types and/or numbers of securing devices may be utilized that are configured to detachably secure the alignment member 16(1) along the track 14(1) of the longitudinal member 12(1). The securing device 38(1), such as a threaded cap may then be released, unscrewed in this example, to allow the alignment member 16(1) to move freely along the track 14(1).

The one or more levels 18 are located within the plurality of holes 24 in the longitudinal member 12(1) and are configured to indicate when the longitudinal member 12(1) is in a level position, although the levels could be at other locations and/or in other orientations. In this particular example the one or more levels 18 are bubble levels, although other types and/or numbers of levels may be utilized.

Figure 4:
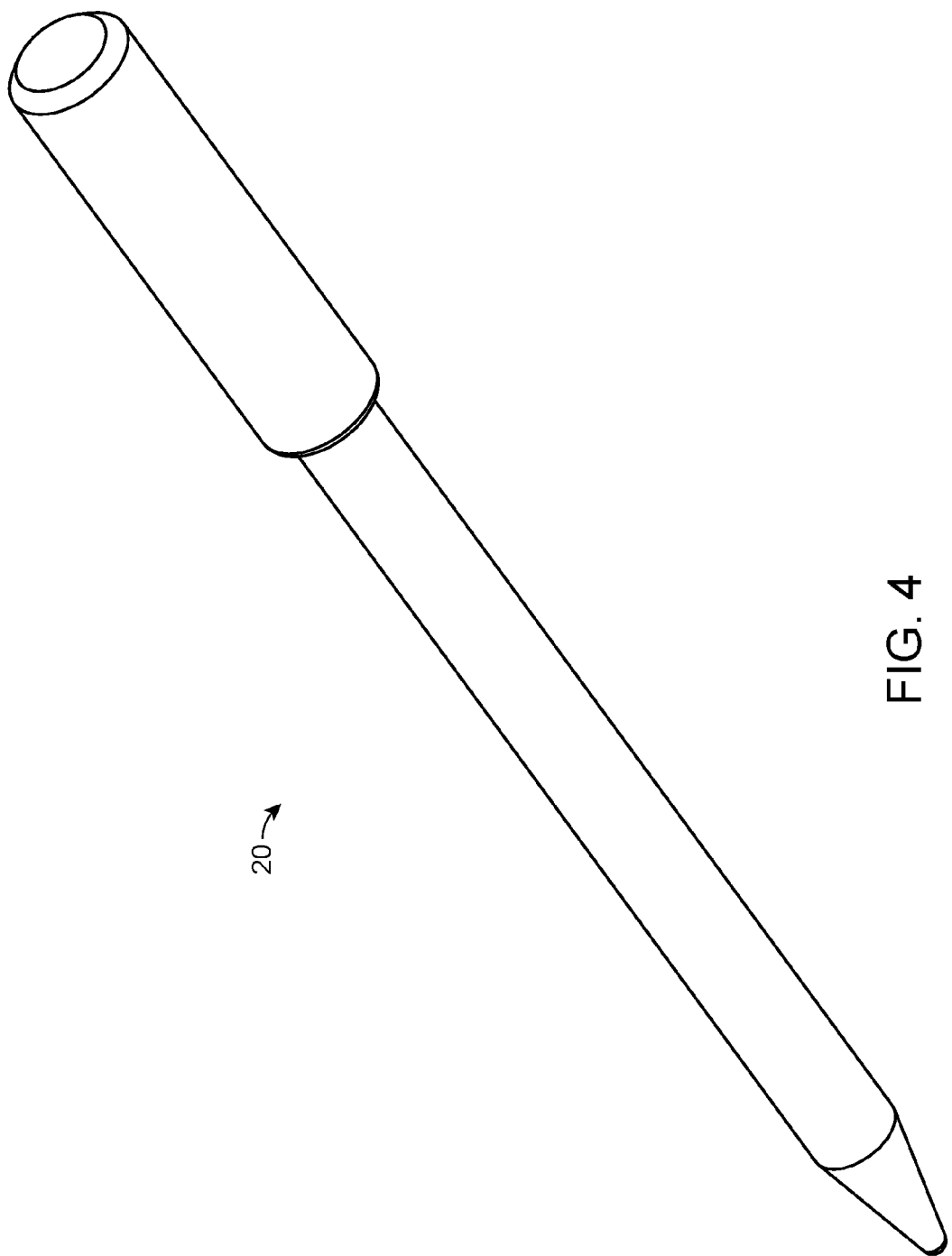
FIG. 4 is a perspective view of an exemplary punch device that may be utilized with the picture hanging devices of the present technology.

The one or more punch devices 20 are configured to be introduced through the hollow center 34 of each of the alignment members 16(1) to provide a hole in a surface, such as a wall, for screwing a fastener into a wall anchor for hanging a picture, although other types and/or numbers of marking devices, such as a scribe, a pen, or a pencil could be used to mark the area to insert a nail. An exemplary punch device 20 is illustrated in FIG. 4. In this example, the punch devices 20 are each 3/16 inch punch devices, although other types and/or numbers of punch or other marking devices with other dimensions may be utilized. Alternatively, the punch devices 20 may each have different dimensions to provide different size holes.

Figure 2C:
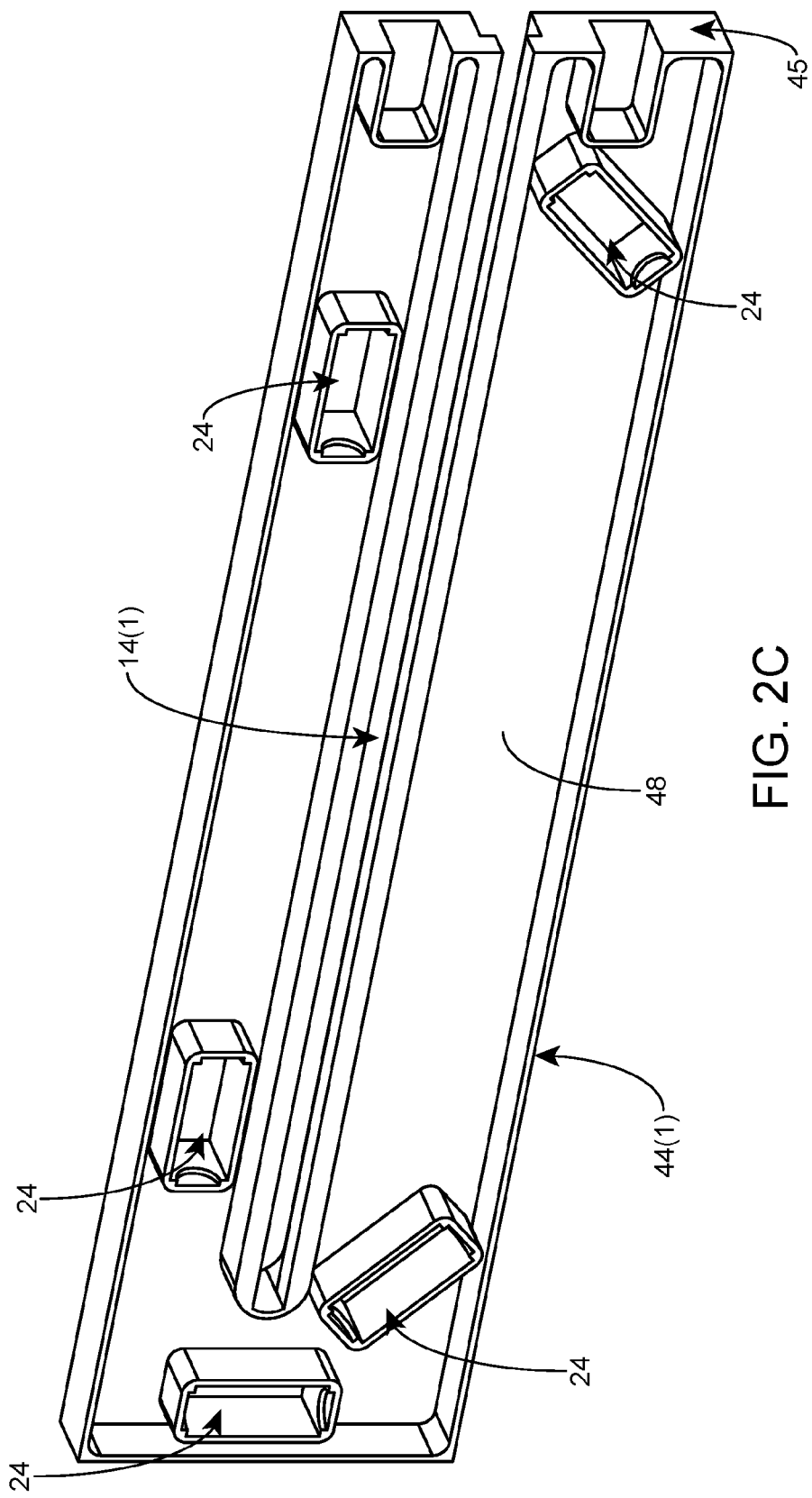
FIG. 2C is a rear perspective view of the first portion of the exemplary picture hanging device shown in FIG. 2B.
Figure 3A:
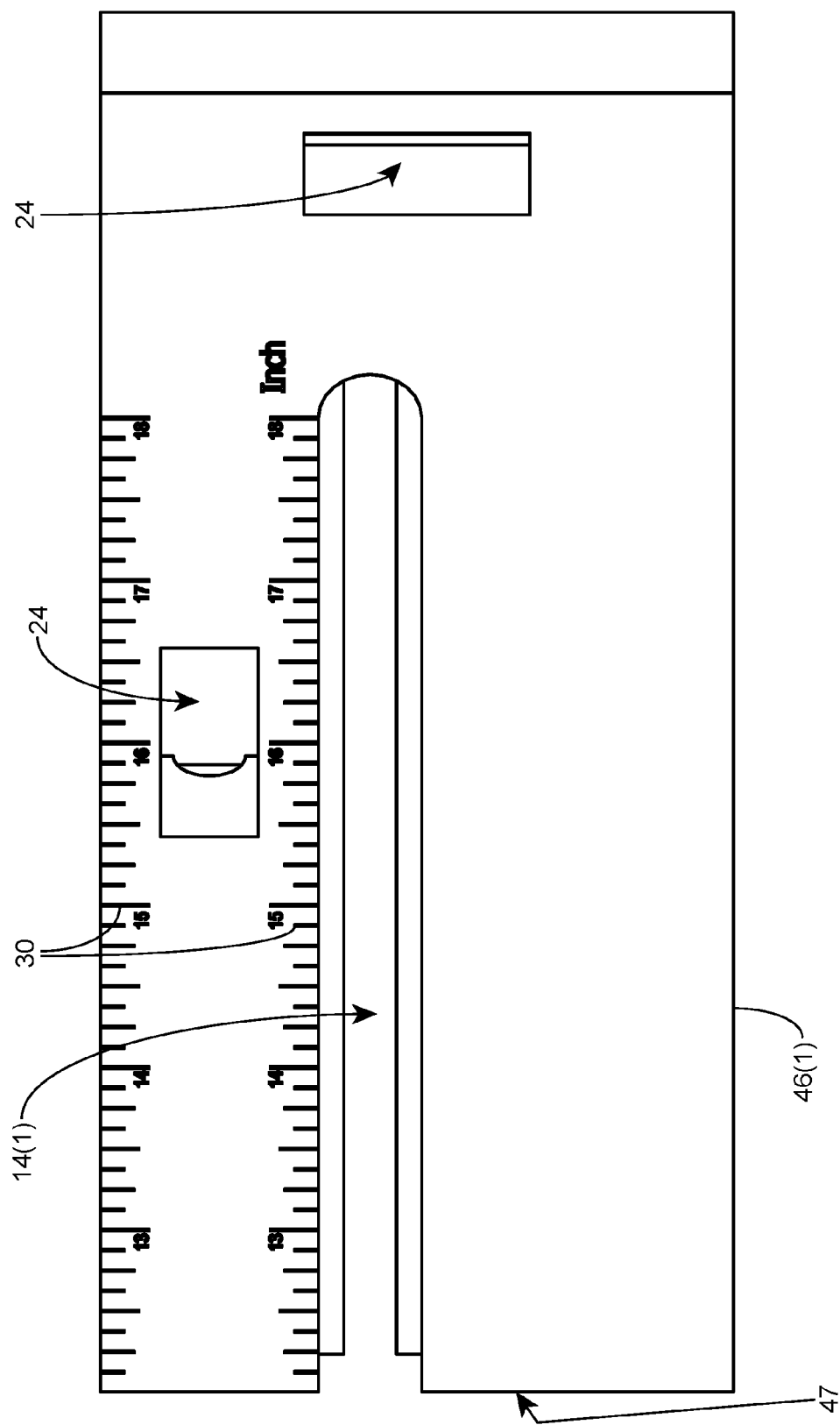
FIG. 3A is a front perspective view of a second portion of the exemplary picture hanging device shown in FIG. 1 with the levelling devices removed.
Figure 3B:
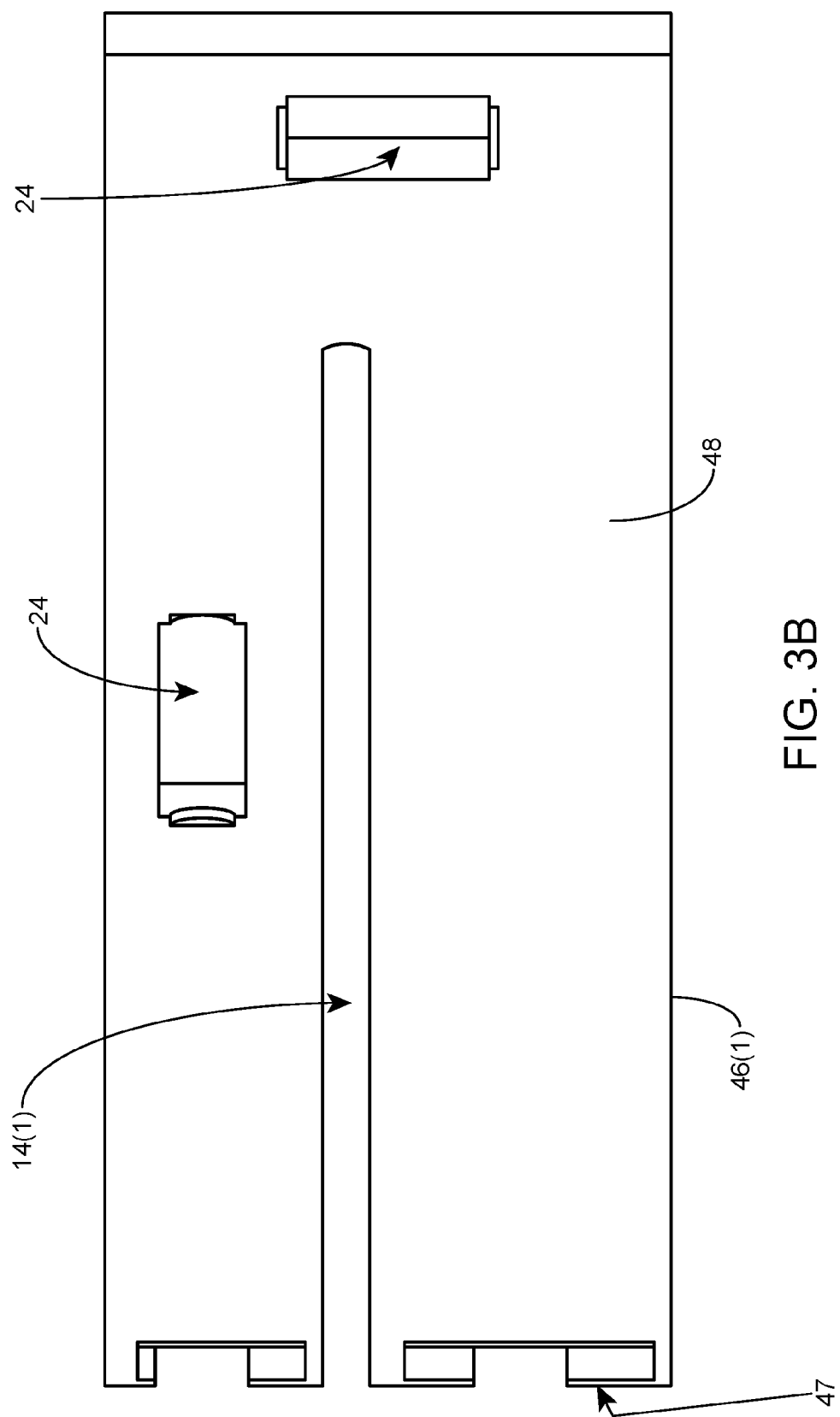
FIG. 3B is a rear perspective view of the second portion of the exemplary picture hanging device shown in FIG. 3A.

Referring now more specifically to FIGS. 2-3B, the longitudinal member 12(1) is formed from a first portion 44(1) and a second portion 46(1) that are coupled together at one end to form the track 14(1). The first portion 44(1) and the second portion 46(1) have respective ends 45 and 47 that fit together in a male/female snap fit arrangement, although the end 45 of the first portion 44(1) and the end 47 of the second portion 46(1) of the longitudinal member 12(1) may be coupled in other manners, for example by a hinge as described below. The first portion 44(1) and second portion 46(1) have rear surfaces 48 that are partially indented to reduce the overall weight of the picture hanging device 10(1) while accommodating the levels 18 as shown in FIGS. 2C and 3B.

Referring more specifically to FIGS. 2A-2C, in one example the first portion 44(1) for the longitudinal member 12(1) portion includes five levels 18 and the holding compartment 26 for holding the punch devices 20 as shown in FIG. 2A. The first portion 44(1) includes a first section of the track 14(1) with markings 30 that provide a 12 inch ruler, although the first portion 44(1) may have other sizes including other markings thereon. The first portion 44(1) includes the end 45 configured to be coupled to the second portion 46(1). In this particular, example, the end 45 is a female end configured to receive end 47, which is a male end of the second portion 46(1), although other coupling configurations in other orientations may be employed.

Referring now to FIGS. 3A and 3B, the second portion 46(1) is configured to be coupled to the first portion 44(1) to extend the overall length of the track 14(1) of the picture hanging device 10(1). The second portion 46(1), in this example, is configured provide an additional six inches, although the second portion 46(1) may provide other lengths, such as twelve inches for larger pictures, to the overall length of the track 14(1). In one example, the first portion 44(1) may be packaged with various attachment second portions 46(1) of different sizes to accommodate pictures of different lengths. The second portion 46(1) includes markings 30 that align with the markings 30 on the first portion 44(1) when the first portion 44(1) and the second portion 46(1) are coupled together to provide an elongated ruler.

An exemplary operation of the picture hanging device 10(1) will now be described with reference to FIG. 1. With a picture frame lying face down, the picture hanging device 10(1) is placed against the frame. The alignment members 16(1) are then repositioned, with the securing devices 38 loosened, along the track 14(1) to match with the hanging hardware on the picture frame. Although two alignment members 16(1) are illustrated, other numbers of alignment members 16(1) may be utilized based on the specific hanging hardware of the picture. Alternatively, the distance between the hanging elements on the picture are measured and the alignment members 16 are positioned along the track 14(1) using the markings 30 located on the body portion 22(1) of the longitudinal member 12(1) as a ruler.

Next, with the alignment members 16(1) matched up to the hanging hardware of the picture, the alignment members 16(1) are locked into place using the securing device 38 for each alignment member 16(1). By way of example, the alignment member 16(1) may be locked into position using a cap configured to be screwed onto the alignment member 16(1) as the securing device 38(1).

The picture hanging device 10(1) is then positioned against a wall in the desired location for mounting the picture. The punch device 20, such as a 3/16 inch punch device, is inserted through the hollow center 34 of one of the alignment members 16(1) and driven into the wall.

After insertion of a first one of the punch devices 20 into the wall, the picture hanging device 10(1) is rotated to a level position based on the indication provided by the various levels 18. Once the picture hanging device 10(1) is level, one of the punch devices 20 is inserted through the other alignment member 16(1) utilized. In the event that additional alignment members 16(1) are utilized, additional punch devices 20 are inserted at this step. The punch devices 20 are then removed from the wall, the picture hanging device 10(1) is taken down, and the holes created are utilized to accurately position wall anchors for mounting the picture, or other item.

Another example of a picture hanging device 10(2) is illustrated in FIGS. 5A-7B. The picture hanging device 10(2) is the same in structure and operation as the picture hanging device 10(1) except as illustrated and described herein. Elements in the picture hanging device 10(2) that are like those in the picture hanging device 10(1) have like reference numerals.

Figure 5A:
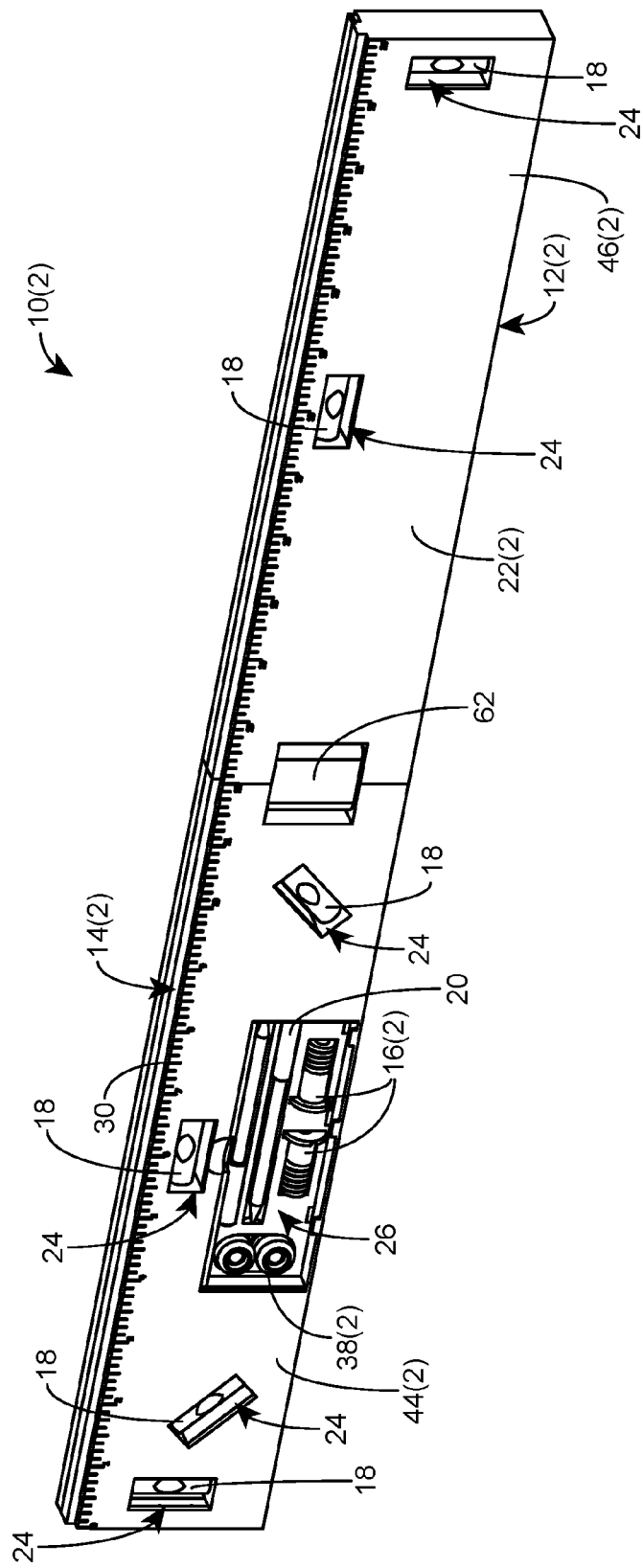
FIG. 5A is a front perspective view of another exemplary picture hanging device.
Figure 5B:
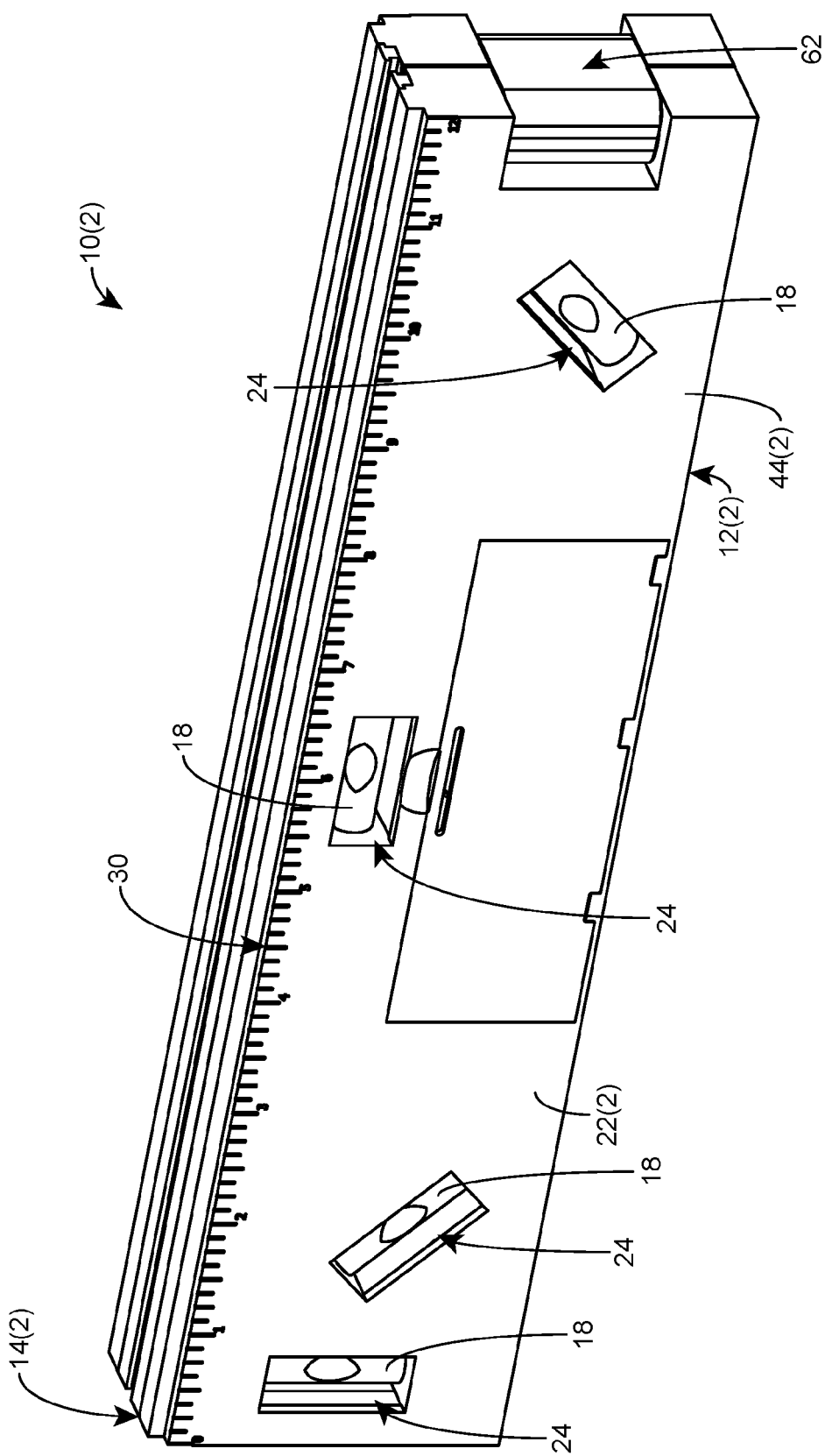
FIG. 5B is a front perspective view of the exemplary picture hanging device shown in FIG. 5A in a folded state.
Figure 5C:
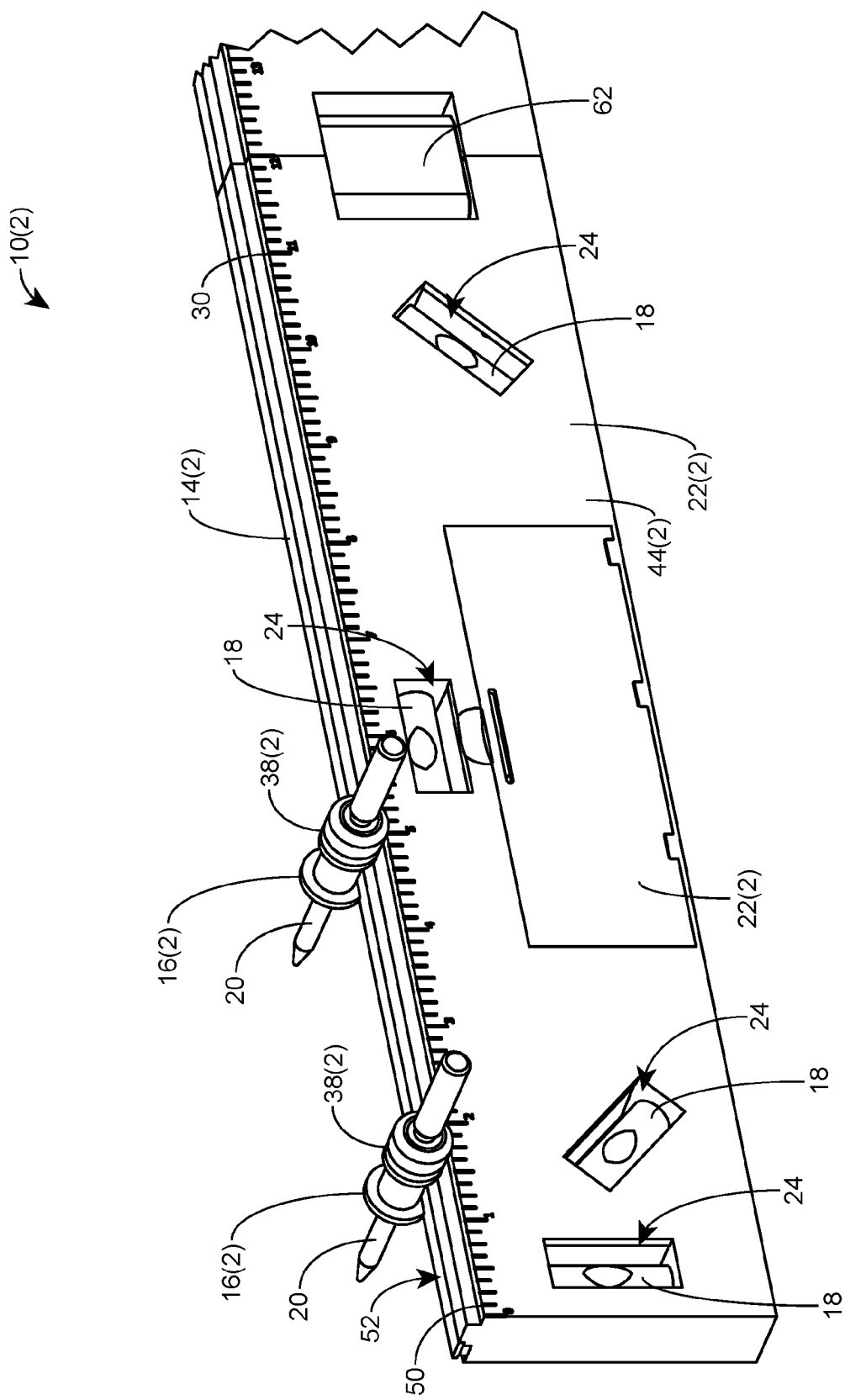
FIG. 5C is a front perspective view of a portion of the exemplary picture hanging device shown in FIG. 5A during use with the alignment members located on the track of the picture hanging device.

Referring more specifically to FIGS. 5A-5C, in this example the picture hanging device 10(2) includes a longitudinal member 12(2) with a track 14(2) that extends along an edge of the longitudinal member 12(2). The longitudinal member 12(2) can be molded from plastic, although the longitudinal member 12(2) can be formed of other materials, such as metals, using other manufacturing techniques. In this particular example, the longitudinal member 12(2) is formed of a lightweight material to facilitate use of the picture hanging device 10(2). The longitudinal member 12(2) is formed as two separate pieces as described below, but may also be molded as a single piece.

Figure 6A:
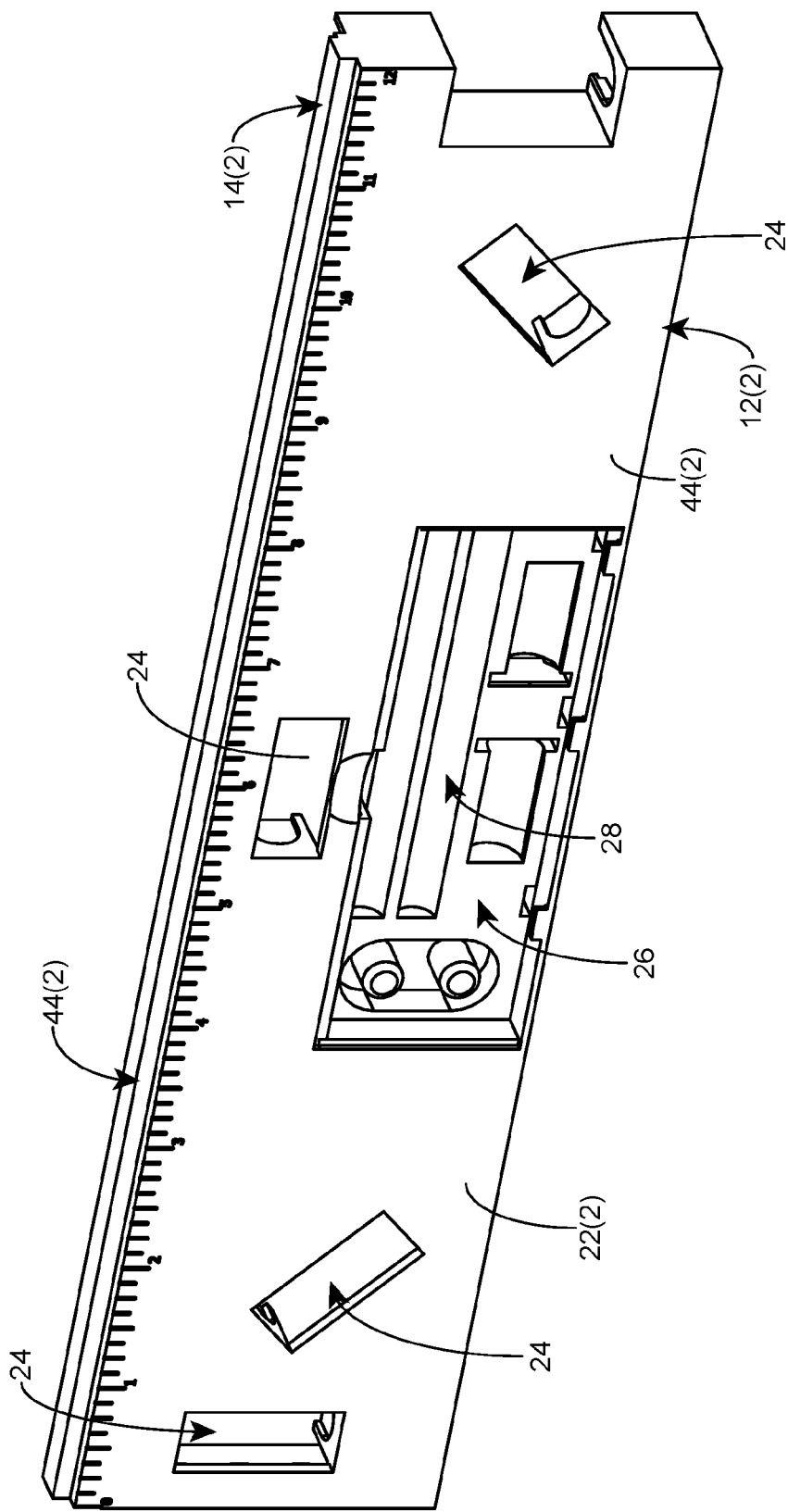
FIG. 6A is a front perspective view of a first portion of the exemplary picture hanging device shown in FIG. 5A with the levelling devices, punch devices, and alignment members removed.

The body portion 22(2) of the longitudinal member 12(2) includes a plurality of holes 24 located therein as shown in FIGS. 6A-7B. Referring again to FIGS. 5A-5C, the plurality of holes 24 are configured to receive level devices 18 to allow the longitudinal member 12(2) to be placed in a level position during use. The plurality of holes 24 may be located at various locations in the body portion 22(2) of the longitudinal member 12(2). In one example, the body portion 22(2) of the longitudinal member 12(2) also includes the optional holding compartment 26 including a recessed area within the body and one or more holding elements 28, as shown in FIG. 6A, configured to securely receive, by way of example through a snap fit, at least two punch devices 20 for storage when not in use, although the longitudinal member 12(2) may include other compartments configured to hold other numbers and types of devices or elements for use with the picture hanging device 10(2). In this example, the holding compartment 26 is also configured to securely receive alignment members 16(1) and securing devices 38 as illustrated in FIG. 5A. Holding compartment 26 may be covered by an optional door to securely store the items inside.

In this example, the track 14(2) is located on an edge along the length of the body portion 22(2) of the longitudinal member 12(2). The body portion 22(2) of the longitudinal member 12(2) includes markings 30 to serve as a ruler located along the track 14(2) for precise alignment of the alignment members 16(2) along the track 14(2) as discussed below. As shown in FIG. 5C, the track 14(2) includes a recessed portion 50 and a ledge portion 52 that extends beyond the recessed portion 50. The recessed portion 50 and the ledge portion 52 provide for coupling to the alignment members 16(2) as described below.

Figure 9B:
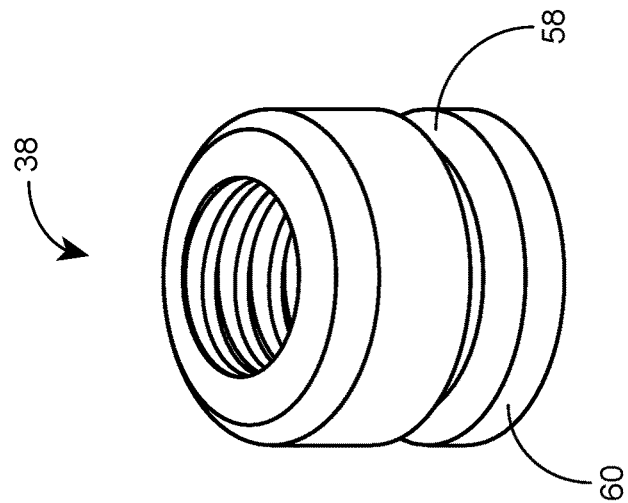
FIG. 9B is a perspective view of a threaded cap for use with the alignment member shown in FIG. 9A.
Figure 9A:
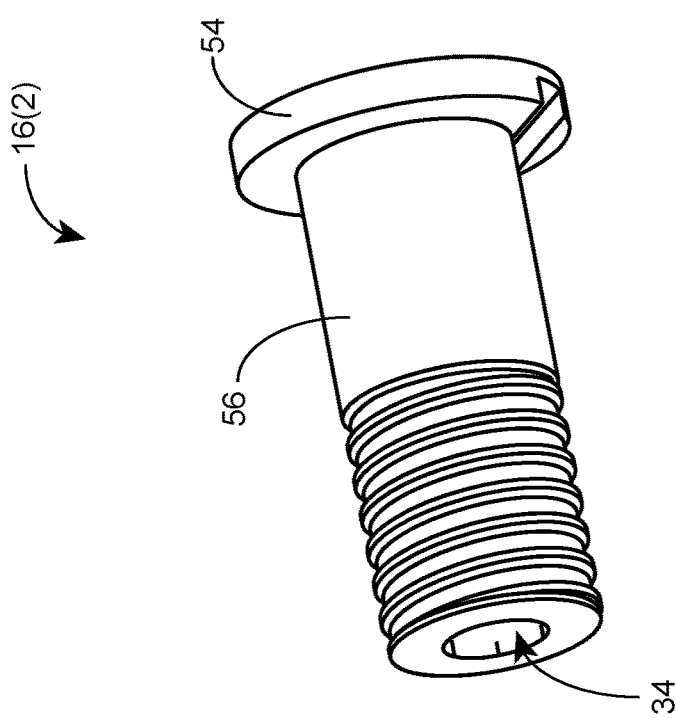
FIG. 9A is a perspective view of an alignment member for use with the exemplary picture hanging device shown in FIG. 5A.

The at least two alignment members 16(2) are configured to be positioned on the track 14(2) along the edge of the body portion 22(2) of the longitudinal member 12(2) as shown in FIG. 5C, although other numbers of alignment members 16(2) may be utilized. An exemplary alignment member 16(2) is shown in FIG. 9A. The alignment members 16(2) are configured to be slidably movable along the track 14(2). The alignment members 16(2) includes a head portion 54 and a cylindrical body 56 having the hollow center 34 configured to receive one of the punch devices 20, such as a 3/16 inch punch device, although the alignment members 16(2) may have other configurations to receive other devices therethrough. The cylindrical body is threaded on one end to receive a securing device 38(2) in the form of a threaded cap, as shown in FIG. 9B. The head portion 54 includes a ledge 58 configured to fit within the recessed portion 50 of the track 14(2) to secure and move the alignment members 16(2) along the track 14(2), although the alignment members 16(2) may include other types and/or numbers members in other locations to facilitate attachment to the track 14(2).

The alignment members 16(2) also each include a securing device 38(2) as shown in FIG. 9B configured to allow the alignment members 16(2) to be fixed at a location along the track 14(2). In this example, the securing device 38(2) is a threaded cap that can be tightened in a screwing fashion along the threaded portion of the cylindrical body 56 of the alignment mechanism 16(2) and against the track 14(2) of the longitudinal member 12(2) to position the alignment member 16(2) along the track 14(2), although other types and/or numbers of securing devices may be utilized that are configured to locate the alignment members 16(2) along the track 14(2) of the longitudinal member 12(2). The securing device 38(2) may then be released, unscrewed in this example, to allow the alignment members 16(2) to move freely along the track 14(2). In this example, the securing device 38(2) includes a recess 58 and a ledge 60 configured to align with ledge portion 52 and the recessed portion 50 of the track 14(2), respectively, during use as illustrated in FIG. 5C.

The one or more levels 18 are located within the plurality of holes 24 in the longitudinal member 12(2) and are configured to indicate when the longitudinal member 12(2) is in a level position. In this particular example the one or more levels 18 are bubble levels, although other types of levels may be utilized.

Referring now to FIGS. 5-8B, in this example the longitudinal member 12(2) is formed from a first portion 44(2) and a second portion 46(2) that are coupled together by hinge 62 to form the track 14(2). The first portion 44(2) and second portion 46(2) may have rear surfaces 48 that are partially indented to reduce the overall weight of the picture hanging device 10(2) while accommodating the levels 18 as shown in FIGS. 6B and 7B.

Figure 6B:
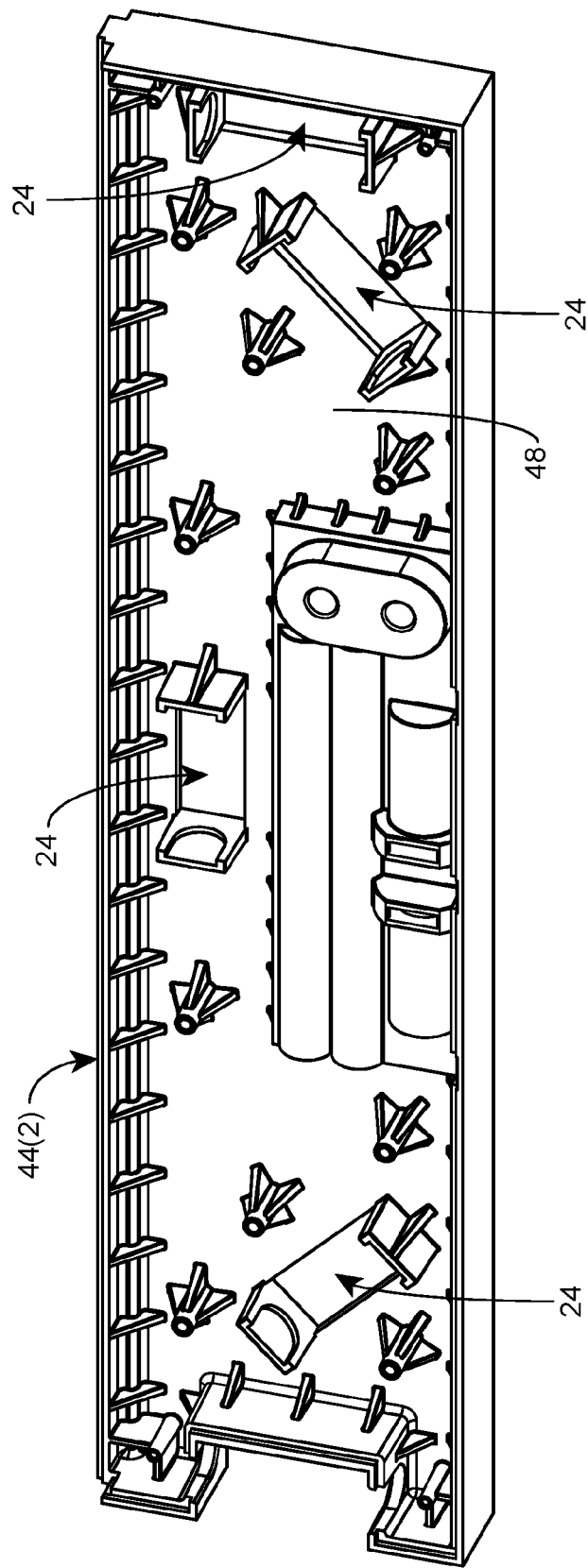
FIG. 6B is a rear perspective view of the first portion of the exemplary picture hanging device shown in FIG. 6A.

Referring more specifically to FIGS. 6A and 6B, in one example the first portion 44(2) for the longitudinal member 12(2) portion includes four holes 24 to receive levels 18 and the holding compartment 26 for holding the punch devices 20, alignment members 16(2), and securing devices 38(2) as shown in FIG. 5A. The first portion 44(2) includes a first section of the track 14(2) with markings 30 that provide a 12 inch ruler, although the first portion 44(2) may have other sizes including other markings thereon, such as providing a 24 inch ruler. The first portion 44(2) includes an end configured to be coupled to the second portion 46(2) through the hinge 62, although the first portion 44(2) and the second portion 46(2) may be coupled in other manners.

Figure 7B:
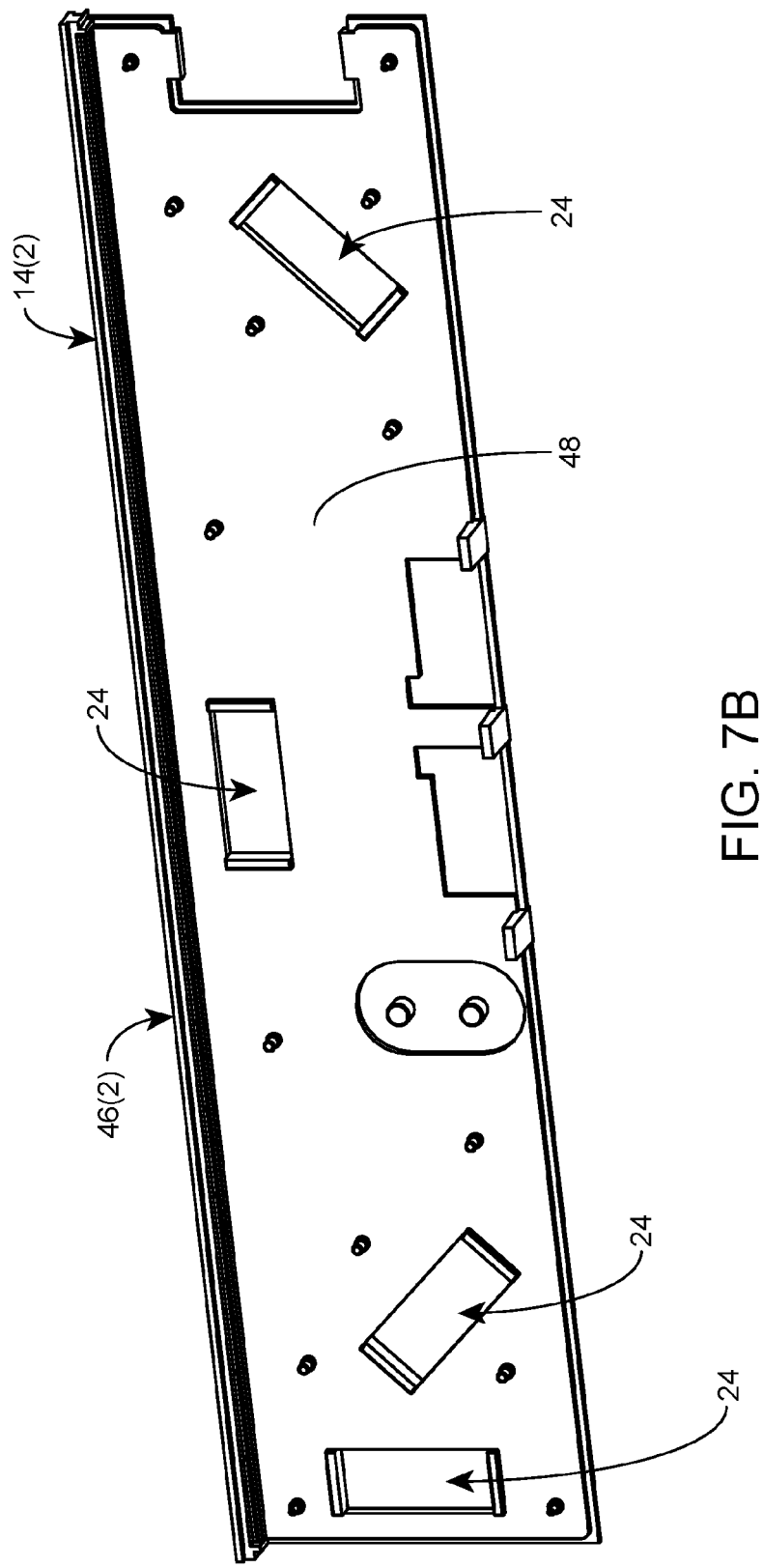
FIG. 7B is a rear perspective view of the second portion of the exemplary picture hanging device shown in FIG. 7A.
Figure 8B:
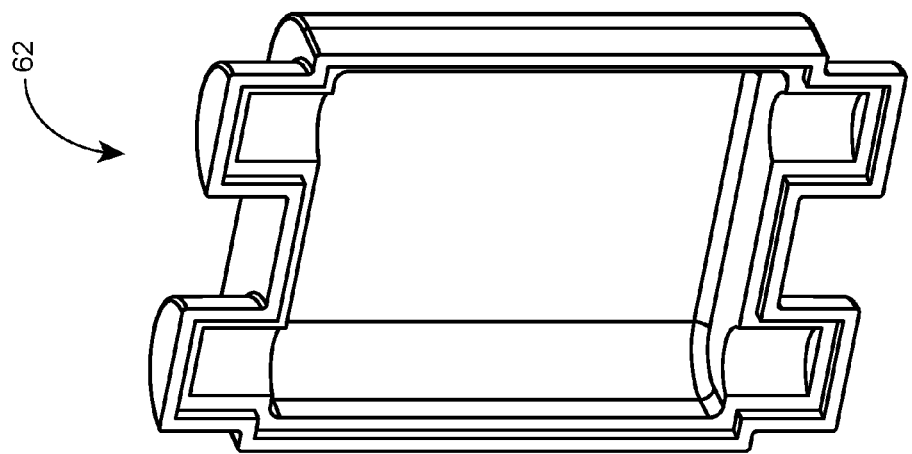
FIG. 8B is a rear perspective view of the hinge shown in FIG. 8A.
Figure 8A:
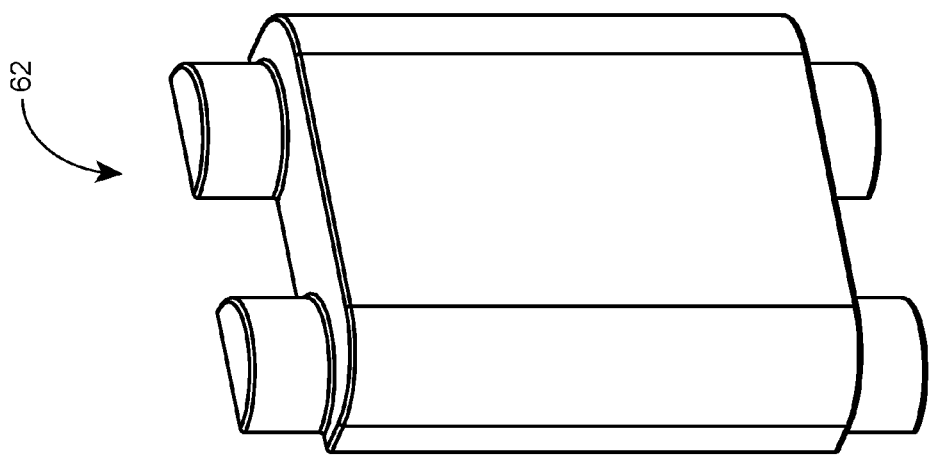
FIG. 8A is a front perspective view of a hinge for coupling the first portion shown in FIGS. 6A and 6B and the second portion shown in FIGS. 7A and 7B of the exemplary picturing hanging device shown in FIG. 5A.

Referring now to FIGS. 7A and 7B, the second portion 46(2) is configured to be coupled to the first portion 44(2) to extend the overall length of the track 14(2) of the picture hanging device 10(2) when the hinge is in the open position as shown in FIG. 5A. The second portion 46(2), in this example, is configured provide an additional twelve inches when the picture hanging device 10(2) is extended, although the second portion 46(2) may provide other lengths, such as twenty four inches for larger pictures, to the overall length of the track 14(2). The second portion 46(2) is foldable through hinge 62 to place the picture hanging device 10(2) in a folded position as shown in FIG. 5B. The second portion 46(2) may be locked to the first portion 46(2) in the folded position. The second portion 46(2) includes markings 30 that align with the markings 30 on the first portion 44(2) when the first portion 44(2) and the second portion 46(2) are extended to provide an elongated ruler.

An exemplary operation of the picture hanging device 10(2) will now be described with reference to FIGS. 5A-7B. With a picture frame lying face down, the picture hanging device 10(2) is placed against the frame. The picture hanging device 10(2) may be utilized in either the extended position illustrated in FIG. 5A or the folded position shown in FIG. 5B. The alignment members 16(2) are then repositioned, with the securing devices 38(2) loosened, along the track 14(2) to match with the hanging hardware on the picture frame. Although two alignment members 16(2) are illustrated, other numbers of alignment members 16(2) may be utilized based on the specific hanging hardware of the picture. Alternatively, the distance between the hanging elements on the picture are measured and the alignment members 16(2) are positioned along the track 14(2) using the ruler located on the body portion 22(2) of the longitudinal member 12(2).

Next, with the alignment members 16(2) matched up to the hanging hardware of the picture, the alignment members 16(2) are locked into place using the securing device 38(2) for each alignment member 16(2). By way of example, the alignment member 16(2) may be locked into position using a threaded cap configured to be screwed onto the alignment member 16(2), such as the securing device 38(2).

The picture hanging device 10(2) is then positioned against a wall in the desired location for mounting the picture. The punch device 20, such as a 3/16 inch punch device, is inserted through the hollow center 34 of one of the alignment members 16(2) and driven into the wall.

After insertion of a first one of the punch devices 20 into the wall, the picture hanging device 10(2) is rotated to a level position based on the indication provided by the various levels 18. Once the picture hanging device 10(2) is level, a second one of the punch devices 20 is inserted through the second alignment member 16(2) and a punch mark may be created, although other types of marks with other types of marking devices may be used. The punch devices 20 are then removed from the wall and the holes or other marks created are utilized to accurately position wall anchors for mounting the picture.

Accordingly, the present technology advantageously provides a picturing hanging device that allows for an easy, efficient picture hanging process that provides level hanging of pictures. Further, the picture hanging device provides a design that is lightweight, easy to use, and more economically produced.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A picture hanging device comprising:
a longitudinal member having a longitudinal track extending along at least a portion of a length of the longitudinal member and at least one level located within the longitudinal member; and
at least two alignment members, the at least two alignment members being cylindrical tubes located in and moveable along the longitudinal track, each of the at least two alignment members having a threaded end configured to receive a threaded cap to detachably secure the at least two alignment members in place at a location along the longitudinal track, wherein the at least two alignment members each comprise a hollow internal portion configured to receive a marking device.

2. The picture hanging device as set forth in claim 1, wherein the longitudinal member further comprises a ruler portion along the longitudinal track.

3. The picture hanging device as set forth in claim 1, wherein the longitudinal member comprises:
a first longitudinal portion having a first end and a second end, wherein at least one of the first end or the second end is configured to be removably coupled to a second longitudinal portion, wherein the first longitudinal portion and the second longitudinal portion form the longitudinal track when coupled.

4. The picture hanging device as set forth in claim 3, wherein the first longitudinal portion has a length of at least 12 inches.

5. The picture hanging device as set forth in claim 3, wherein the second longitudinal portion has a length of at least 6 inches.

6. The picture hanging device as set forth in claim 3, wherein the second longitudinal portion has a length of at least 12 inches.

7. The picture hanging device as set forth in claim 1, wherein the longitudinal member comprises:
   a first longitudinal portion hingedly attached to a second longitudinal portion.

8. The picture hanging device as set forth in claim 1, wherein the marking device comprises a punch device.

9. The picture hanging device as set forth in claim 1 further comprising:
   a holding compartment within the longitudinal member configured to detachably secure at least two marking devices.

10. A method of making a picture hanging device comprising:
   providing a longitudinal member having a longitudinal track extending along at least a portion of a length of the longitudinal member and at least one level located within the longitudinal member; and
   coupling at least two alignment members to the longitudinal member, the at least two alignment members being cylindrical tubes located in and moveable along the longitudinal track, each of the at least two alignment members having a threaded end configured to receive a threaded cap to detachably secure the at least two alignment members in place at a location along the longitudinal track, wherein the at least two alignment members each comprise a hollow internal portion configured to receive a marking device.

11. The method as set forth in claim 10, wherein the longitudinal member further comprises a ruler portion along the longitudinal track.

12. The method as set forth in claim 10, wherein the longitudinal member comprises:
   a first longitudinal portion having a first end and a second end, wherein at least one of the first end or the second end is configured to be coupled to a second longitudinal portion, wherein the first longitudinal portion and the second longitudinal portion form the longitudinal track when coupled.

13. The method as set forth in claim 12, wherein the first longitudinal portion has a length of at least 12 inches.

14. The method as set forth in claim 12, wherein the second longitudinal portion has a length of at least 12 inches.

15. The method as set forth in claim 10, wherein the longitudinal member comprises:
   a first longitudinal portion hingedly attached to a second longitudinal portion to provide an extended position with the first longitudinal portion and the second longitudinal portion along an axis and a closed position with the first longitudinal portion and the second longitudinal portion parallel to one another.

16. The method as set forth in claim 15, wherein the first longitudinal portion and the second longitudinal portion are configured to be releasably attached to one another in the closed position.

17. The method as set forth in claim 10, wherein the marking device comprises a punch device.

18. The method as set forth in claim 10 further comprising:
   forming a holding compartment within the longitudinal member configured to detachably secure at least two marking devices.

* * * * *